Figure 1:
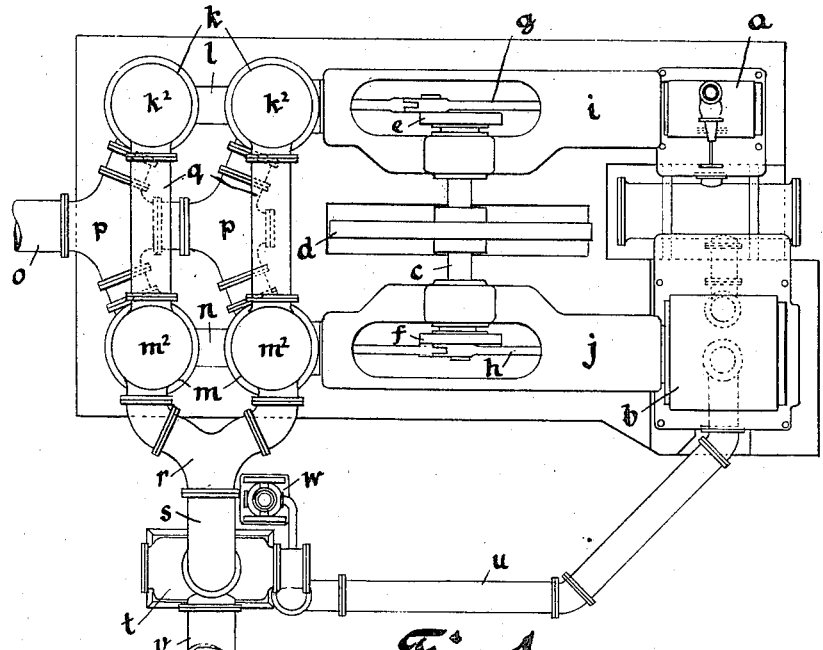

C. T. MYERS.
PUMPING ENGINE PLANT.
APPLICATION FILED AUG. 1, 1910.

1,034,490.

Patented Aug. 6, 1912.

Witnesses
Henry F Schmitt
Florence M Mallon

Cornelius T. Myers,
Inventor
By George Detmore Colt
Attorney

UNITED STATES PATENT OFFICE.

CORNELIUS T. MYERS, OF RACINE, WISCONSIN.

PUMPING-ENGINE PLANT.

1,034,490.  Specification of Letters Patent.  Patented Aug. 6, 1912.

Application filed August 1, 1910. Serial No. 574,970.

*To all whom it may concern:*

Be it known that I, CORNELIUS T. MYERS, of Racine, Wisconsin, have invented a Pumping-Engine Plant, of which the following is a specification.

This invention relates to heavy-duty pumping-plants and more especially to the special type of pumping-engines wherein plungers are caused to reciprocate transversely in vertical cylinders provided with intake and discharge valves at the top and bottom. Such engines are compound-engines with high-and-low pressure cylinders and cranks connected by a fly-wheel or equalizing-shaft, and with a pair of such vertical cylinders for each of the high- and low-pressure sides, each side carrying a plunger, the two ends of which reciprocate in different cylinders. There being, therefore, four such cylinders of large dimensions which work together in parallel, it has been a matter of some difficulty to so arrange the piping system as to provide for an inlet and discharge from all four cylinders. Heretofore this has been done by providing an intake midway between the two pairs of cylinders and connected thereto at the bottom by means of two branches on either side, and a similar branched piping system at the top leading out in the same direction as and immediately over the intake. As it is customary in plants of this sort to pass the water pumped through the condenser and thus avoid the necessity of having a separate circulating-system and pump, the above described system has necessitated, on account of the very large pipes used, the placing of the condenser at that end of the plant most distant from the engine-cylinders; which in turn has necessitated a very long exhaust-piping from the latter to the condenser, together with several rectangular bends, which as is well-known to those skilled in the art, lower seriously the effective vacuum obtainable, at the engine cylinder, thus affecting in a notable degree the economy of the engine.

My invention has, therefore, for its object to provide a better relative disposition of engine, condenser and discharge-piping, whereby the condenser is brought very much closer to the engine, so as to practically diminish by one-half the length of piping and number of bends required.

According to my invention, the discharge-piping, instead of causing the discharge to pass out through the four-branched piping at the lower end of the plant, the pair of cylinders on the high-pressure side are connected directly by pipes with the respective cylinders on the low-pressure side, and the discharge from the latter in turn is carried out through a pipe having two branches only to one side of the plant, at which point the condenser is placed.

Figure 2:
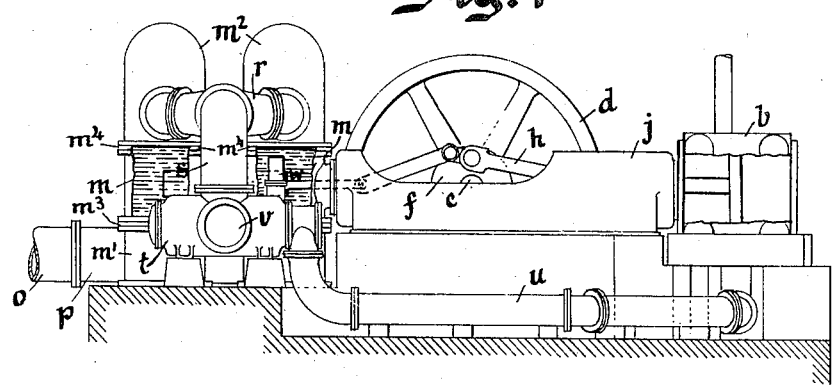
Figure 3:
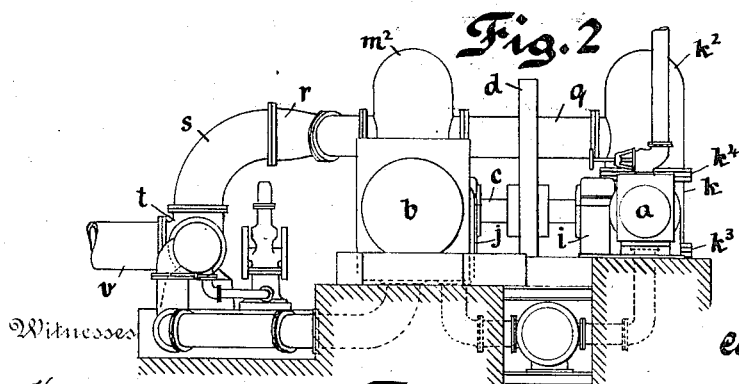

To illustrate this novel disposition, I have shown in Figs. 1, 2 and 3 of the accompanying drawings a plan-view, side-elevation and end-elevation respectively of a plant so disposed.

The reference letters refer each to the same part in each figure of the drawings.

In the drawings, $a$ and $b$ represent the high and low-pressure cylinders respectively of a horizontal compound-engine whose fly-wheel shaft is shown at $c$ and fly-wheel at $d$, and which has crank-disks $e$ and $f$ on its ends connected by the connecting-rods $g$ and $h$ to the high- and low-pressure piston-rods which are concealed within the engine-frames $i$ and $j$.

$k$ denotes the two pumping-cylinders which are operated by the high-pressure side, through a plunger $l$, which reciprocates in and out transversely through the side of these cylinders, and $m$ the two similar cylinders on the low-pressure side which are worked by a similar plunger $n$. The cylinders are in three parts, as shown in Fig. 2, the lower part forming the intake-chamber ($m'$ in Fig. 2) and the upper parts $k^2$, $m^2$ forming the discharge-chambers; and these parts being separated by partitions $m^3$, $m^4$ which carry the self-closing, upwardly-opening valves, common to pumping-engines of this class, and which are not herein shown as they form no part of my invention.

The intake water is brought to the pumping-cylinders through the main pipe $o$, and connected to the lower chambers $m'$ thereof by the two three-branched castings $p$, said castings being connected in series as shown and the two branches thereof each going to opposite cylinders. This is according to the design heretofore in use, and according to such design the discharge is identical with and immediately over the intake. Now, according to my invention such four-branch discharge-way is abolished, and instead thereof the upper chambers $k^2$ of the two high-pressure cylinders $k$ are connected by pipes $q$ to the upper chambers $m^2$ of the cylinders m on the low-pressure side, so as to discharge therethrough; and the chambers m² in turn are connected by the two-branched pipe r to an elbow s, which delivers into the condenser t immediately beneath; this condenser being therefore at the side of the low-pressure engine, to the cylinder of which it is connected by the exhaust-pipe u, such connection necessitating but two rectangular and two half-rectangular bends instead of the much greater length of pipe of the four rectangular and two half-rectangular bends heretofore required. The discharge-water, after circulating through the condenser, passes out to the reservoir or water-supply system through the pipe v. The air-pump for the condenser is shown at w.

Besides the saving in cost of piping and the greater economy and simplicity obtained by my improved disposition of elements, it is also to be noted that the location of the condenser as shown is much more convenient than the old location, which, being disposed immediately over the intake, could not be set on the floor-level but had to be placed upon a raised platform and this increased the length of piping and number of bends required.

Having thus described my invention, what I claim as new and desire to secure by Letters Patent is:

1. In a pumping-engine plant, the combination with the compound-engine having high- and low-pressure sides disposed side by side in parallel relation, and the two pairs of upright pump-cylinders each divided by valves into three parts, the part at one end of said cylinder being the intake-chamber and that at the other end of each cylinder the discharge-chamber, plungers driven by the engines and operating transversely in the middle parts of the respective cylinders, pipes connecting the discharge-chambers of the cylinders on one side with those of the cylinders on the other side, a condenser at the side of the engine, exhaust-piping from the engine-cylinders to said condenser, and a two-branched discharge-pipe leading from said last-named discharge-chambers into said condenser.

2. In a pumping-engine plant, the combination with the compound-engine having high- and low-pressure sides disposed side by side in parallel relation, and the two pairs of upright pump-cylinders each divided by valves into three parts, the parts at one end of said cylinders being the intake-chambers and that at the other end of each cylinder the discharge-chambers, plungers driven by the engines and operating transversely in the middle parts of the respective cylinders, pipes connecting the discharge-chambers of the cylinders on one side with those of the cylinders on the other side, a condenser at the low-pressure side of the engine, exhaust-piping from the engine-cylinders to said condenser, and a two-branched discharge-pipe leading from said low-pressure discharge-chambers into said condenser.

3. In a pumping-plant of the type described, the combination with the compound-engine consisting of high- and low-pressure engines disposed side by side in parallel relation, four upright pump-cylinders disposed in two pairs, the cylinders of each pair being in tandem relation in the center line of the cylinder, a pair of plungers one of which operates in each pair of cylinders and is driven by the respective engine, each of said cylinders being divided into three parts, a condenser at the side of the low-pressure engine, pipes connecting the discharge passages of the high-pressure pump-cylinders with those of the low-pressure pump-cylinders, and a branched pipe connecting the latter with the condenser.

4. In a pumping-engine plant of the type described, the combination with the compound-engine consisting of a high- and low-pressure horizontal engine disposed side by side in parallel relation, two pairs of vertical pump-cylinders, the members of each pair being disposed in tandem relation to the respective engines and the members of one pair being opposite those of the other pair, each of said pumping-cylinders being divided by transversely disposed valve-mechanism into lower, middle, and upper chambers, a pair of plungers operated by the respective engines and each reciprocating transversely in said middle chambers, intake piping delivering water to said lower chambers, pipes connecting the upper chambers of the pump-cylinders on the high-pressure side with those of the pump-cylinders on the low-pressure side, a condenser disposed at the side of the low-pressure engine, exhaust piping connecting the low-pressure cylinder with said condenser, and a two-branched discharge pipe connecting the upper chambers of the pumping-cylinders on the low-pressure side with the circulating side of said condenser.

5. In a pumping-plant, the combination of a plurality of pumping-cylinders operating in parallel, a steam-engine for working said cylinders, intake piping leading to said cylinders from the opposite side to said engine, discharge piping passing from said cylinders in a direction at right angles to that of the intake piping and at one side of said engine, a surface-condenser located at one side of said engine and into the water-side of which said discharge-piping delivers, and exhaust-piping leading from the same side of said engine as the condenser and delivering into the steam-side of said condenser.

6. In a pumping-plant, the combination of four pumping-cylinders operating in parallel, and arranged at the corners of a rectangle, a steam engine at one side of said cylinders and adapted to pump water from the lower end to the top thereof, intake-piping leading to said cylinders and delivering into the bottom thereof from the side opposite to said engine, and a pair of discharge-pipes at right-angles to the direction of said intake-piping leading from the top-ends of said cylinders, each of said discharge-pipes passing from one cylinder to the opposite one, and thence out at one side of the engine.

In witness whereof I have hereunto set my hand in the presence of two witnesses.

CORNELIUS T. MYERS.

Witnesses:
ELBERT B. HAND,
MAUDE WILD.